(12) United States Patent
Linard et al.

(10) Patent No.: US 10,636,147 B2
(45) Date of Patent: Apr. 28, 2020

(54) METHOD FOR CHARACTERIZING IMAGES ACQUIRED THROUGH A VIDEO MEDICAL DEVICE

(71) Applicant: Mauna Kea Technologies, Paris (FR)

(72) Inventors: Nicolas Linard, Paris (FR); Barbara Andre, Paris (FR); Julien Dauguet, Paris (FR); Tom Vercauteren, London (GB)

(*) Notice: Subject to any disclaimer, the term of this patent is extended or adjusted under 35 U.S.C. 154(b) by 0 days.

(21) Appl. No.: 15/997,936

(22) Filed: Jun. 5, 2018

(65) Prior Publication Data
US 2018/0286049 A1   Oct. 4, 2018

Related U.S. Application Data

(63) Continuation of application No. 15/028,188, filed as application No. PCT/EP2014/071928 on Oct. 13, 2014, now Pat. No. 10,002,427.

(60) Provisional application No. 62/002,325, filed on May 23, 2014, provisional application No. 61/889,711, filed on Oct. 11, 2013.

(51) Int. Cl.
*A61B 5/00* (2006.01)
*G06T 7/00* (2017.01)
*G06T 7/174* (2017.01)

(52) U.S. Cl.
CPC ............ *G06T 7/0016* (2013.01); *G06T 7/174* (2017.01); *G06T 2207/10068* (2013.01)

(58) Field of Classification Search
CPC .................................... A61B 5/00; G06T 7/00
USPC .......................................................... 382/128
See application file for complete search history.

(56) References Cited

U.S. PATENT DOCUMENTS

| | | | | |
|---|---|---|---|---|
| 5,807,256 A | * | 9/1998 | Taguchi | G06F 19/321 600/300 |
| 9,107,569 B2 | * | 8/2015 | Gupta | A61B 1/00009 |
| 2012/0281923 A1 | * | 11/2012 | Irani | G06K 9/3241 382/218 |

* cited by examiner

*Primary Examiner* — Abolfazl Tabatabai
(74) *Attorney, Agent, or Firm* — Osha Liang LLP

(57) ABSTRACT

According to a first aspect, the invention relates to a method to support clinical decision by characterizing images acquired in sequence through a video medical device. The method comprises defining at least one image quantitative criterion, storing sequential images in a buffer, for each image (10) in the buffer, automatically determining, using a first algorithm, at least one output based on said image quantitative criterion and attaching said output to a timeline (11).

14 Claims, 5 Drawing Sheets

METHOD FOR CHARACTERIZING IMAGES ACQUIRED THROUGH A VIDEO MEDICAL DEVICE

FIELD OF THE INVENTION

The invention relates generally to image and video processing and in particular to a system and method to characterize the interpretability of images acquired in sequences and especially images acquired through a video medical device.

BACKGROUND

Video acquisition devices generate massive amounts of data. Efficient use of this data is of importance for video editing, video summarization, fast visualization and many other applications related to video management and analysis.

As illustrated in Koprinskaa et al., ("Temporal video segmentation: A survey.", *Signal Processing: Image Communication,* 16 (5), 477-500 (2001)), temporal video segmentation is a key step in most existing video management tools. Many different types of algorithms have been developed to perform the temporal segmentation.

Early techniques focused on cut-boundary detection or image grouping using pixel differences, histogram comparisons, edge differences, motion analysis and the like, while more recent methods such as presented in U.S. Pat. No. 7,783,106B2 and U.S. Pat. No. 8,363,960B2 have also used image similarity metrics, classification and clustering to achieve the same goal.

In some applications as the ones in Sun, Z. et al. ("Removal of non-informative frames for wireless capsule endoscopy video segmentation", *Proc. ICAL* pp. 294-299 (2012)) and Oh, J.-H. et al. ("Informative frame classification for endoscopy video", *Medical Image Analysis,* 11 (2), 110-127 (2007)), the problem of temporal video segmentation may be reformulated as a classification problem that distinguishes between informative and noise images.

In US20070245242A1, temporal video segmentation has been coupled with the computation of similarity across scenes so as to produce video summaries.

In the medical device area, and in particular in the field of endoscopy, evaluation of motion patterns has played an important role in the analysis of long videos.

In U.S. Pat. No. 7,200,253B2, a system to evaluate the motion of an ingestible imaging capsule and to display the motion information against time is disclosed.

Similar motion information was used in US20100194869A1 for temporal video segmentation of endoscopy videos. Fast screening of the content of the video is implemented by only displaying the first image of each temporal segment; therefore skipping all other images.

To address the same goal of fast video screening in endoscopy but without skipping images, US20100194869A1 rely on motion evaluation to compute a replay speed inversely proportional to the estimated motion.

By relying on video mosaicing tools, an efficient representation of endomicroscopic videos in which consecutive images have overlap is disclosed in U.S. Pat. No. 8,218,901B2.

To ease the interpretation of entire endomicroscopic videos, André, B. et al. ("A Smart Atlas for Endomicroscopy using Automated Video Retrieval", *Medical Image Analysis,* 15 (4), 460-476 (2011)) proposed a method relying on visual similarity between a current video and videos from an external database to display visually similar but annotated cases in relation to the current video.

A similar approach is disclosed in André, B. et al. ("Learning Semantic and Visual Similarity for Endomicroscopy Video Retrieval", *IEEE Transactions on Medical Imaging,* 31 (6), 1276-1288 (2012)) to complement visual similarity with semantic information. On a related topic (André, B. et al. "An image retrieval approach to setup difficulty levels in training systems for endomicroscopy diagnosis", *MICCAI* (pp. 480-487). Beijing: LNCS (2010)) presented a means of evaluating a difficulty level associated with the interpretation of a given endomicroscopy video.

In clinical scenarios, video analysis may need to be performed during the procedure. To work around the issue of computational time (US20110274325A1) discloses a method that takes advantage of a freezed buffer of consecutive images to perform computationally intensive tasks while continuing the image acquisition.

As illustrated in the aforementioned work, prior art shows that a real need exists for efficient use of videos acquired with a medical device. Although efficient use of video data has been addressed both in clinical and non-clinical scenarios, none of the previous approaches teach a method to characterize the interpretability of the images composing a video acquired with a medical device.

Patent document US2006/293558 discloses a method for automated measurement of metrics reflecting the quality of a colonoscopic procedure. Patent document US2011/301447 discloses a method for classifying and annotating clinical features in medical video by applying a probabilistic analysis of intra-frame or inter-frame relationships in both spatially and temporally neighboring portions of video frames.

SUMMARY

One object of the proposed invention is to improve the efficiency of the use of data acquired with a video medical device. For this purpose, we disclose a system and method to characterize the interpretability of images to support clinical decision. The method disclosed herein is based on the characterization of images acquired in sequence through a video medical device and comprises:
  defining at least one image quantitative criterion, also referred to as the interpretability criterion,
  storing sequential images in a buffer,
  for each image in the buffer, automatically determining, using a first algorithm, at least one output based on said interpretability criterion,
  attaching said output to a timeline.

This enables the user of the medical video data to focus its attention on the most interpretable parts of the acquisition.

Video medical devices to acquire images may be any device known to one of ordinary skill in the art including, but not limited to: endomicroscopes, optical coherence tomography devices, classical endoscopy, High Definition endoscopy, Narrow Band Imaging endoscopy, FICE® endoscopy, double-balloon enteroscopy, zoom endoscopy, fluorescence endoscopy, 2D/3D ultrasound imaging, echo-endoscopy or any other interventional imaging modality.

According to a variant, the method further comprises displaying images of said buffer together with said timeline. Advantageously, the method further comprises indicating the position of the displayed image in the timeline using a cursor of said timeline.

An output of the first algorithm may be a value among a set of discrete values. The value may typically be an alpha-numerical value. In this case the timeline may be formed of temporal regions corresponding to consecutive images with equal output. These temporal regions may constitute a temporal classification or temporal segmentation of the video of interest. In the particular case of a binary output, these temporal regions may constitute a temporal binary segmentation of the video of interest.

An output of the first algorithm may also be a continuous scalar or vector value. In some cases, the algorithm may have two different outputs, one being a discrete value, the other one being a continuous scalar or vector value. One example pertaining to diagnosis would be as such; the first discrete output would indicate a predicted diagnostic class while the other continuous output would indicate the probability of belonging to each pre-defined diagnostic class.

According to a variant, the values of the output of the first algorithm are represented by colors, said colors being superimposed on the displayed timeline. The values of the output of the first algorithm may also be displayed beside the currently displayed image.

According to a variant, when temporal regions corresponding to consecutive images with equal output are defined, the method may further comprise selecting at least one temporal region and extracting from the buffer the images corresponding to said temporal regions. The extracted images may for example be stored on a storage device. The extracted images may also be processed using a second algorithm and the output of the second algorithm displayed. For example, the second algorithm may be a content-based video or image retrieval algorithm, an image or video mosaicing algorithm, an image or video classification algorithm or the like.

The selection of the at least one temporal region may be performed either fully automatically or may depend on some user interaction. For example, the second algorithm may utilize the complete set of images for all segmented temporal regions. It may also be based on a simple selection algorithm or may require user interaction to choose the selected regions.

According to a variant, the first algorithm may generate intermediate results associated with each image of the buffer. The method may therefore comprise storing said intermediate results into an internal database. The internal database may be for example updated upon each update of the buffer. According to a variant, the first algorithm may use intermediate results of the internal database.

When images corresponding to temporal regions are extracted and processed using a second algorithm, said second algorithm might use the intermediate results of the internal database.

According to a variant, an interpretability criterion may be kinetic stability.

For example, kinematic stability may be evaluated using analysis of feature matches. The features may be located on a regular or perturbed grid. For example grid perturbation is driven by local image saliency.

A vote map may be used to select and count the number of votes that determines kinematic stability.

Kinematic stability may be initially performed in a pairwise manner on consecutive images, and a signal processing step may be performed on the initial kinematic stability signal to provide the kinematic stability output.

According to the targeted clinical application, the interpretability criterion may be at least one among the non limitative list: kinematic stability, similarity between images, e.g. similarity between images within the buffer, probability of belonging to a category, e.g. probability of belonging to a given category of a predetermined set of categories, image quality, difficulty of proposing a diagnosis or a semantic interpretation, image typicity or atypicity or image ambiguity.

Further, an interpretability criterion may use the similarity between images within the buffer and images within an external database.

The above and other objects, features, operational effects and merits of the invention will become apparent from the following description and the accompanying drawings.

DETAILED DESCRIPTION

Figure 1:
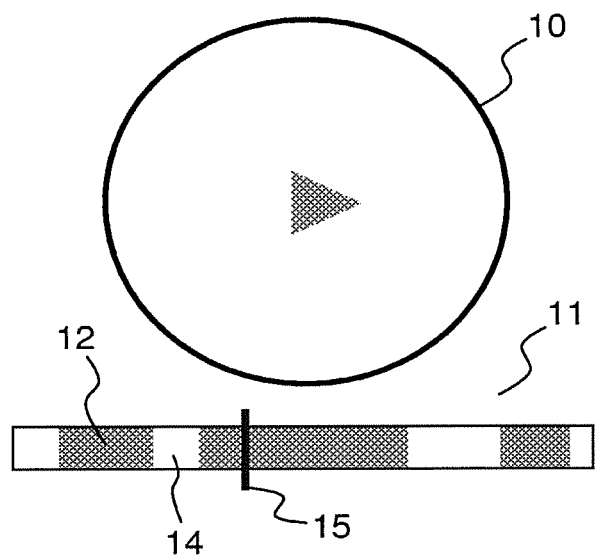
FIG. 1 is a schematic view of a video acquired with a medical device being displayed in association with a timeline highlighting temporal regions of sufficient interpretability.

In a basic mode of operation, a medical video acquisition device acts as an input to our system. Real-time video processing may be performed during acquisition, and the images may be displayed. In the meantime, the images are queued in a finite first-in-first-out (FIFO) buffer while the potential results of the real-time computation may be stored in an internal database.

In a second mode of operation, our system may use a video that was previously recorded by a video medical device as input. In this case, the images composing the video are also queued in a FIFO buffer. If real-time computation was performed during the acquisition and was recorded together with the images, the results from the computations may be loaded in an internal database.

In both modes of operation, the internal database might be updated each time the image buffer gets updated.

Upon review of the images stored in the input buffer, our system automatically characterizes the interpretability of the images composing the buffer and attaches its output to a timeline corresponding to the content of the images in the buffer. The characterization of the interpretability may rely on previously performed real-time computations as well as post-processing computations.

Depending on the targeted clinical application, interpretability may be characterized according to different underlying criteria. These criteria may be related to different notions such as, but not limited to:

kinematic stability, similarity of the images within the buffer, amount of new information uncovered by an image with respect to previous ones, image quality, presence and importance of artifacts, nature and type of imaging artifacts, probability of belonging to a given category, e.g. diagnostic class, within a predefined set of categories, image typicity or atypicity, image ambiguity, e.g. visual ambiguity with respect to a set of diagnostic classes, difficulty of proposing a diagnosis or a semantic interpretation.

In endomicroscopy, an imaging probe is typically put in contact with, or put close to, the tissue to acquire images. Real-time acquisition may be performed thanks to mirror scanning across the field of view. Because of the continuous motion of the probe with respect to the tissue during the mirror scanning, the images are subject to motion artifacts. The magnitude of these artifacts is typically correlated to the interpretability of images. Indeed, if too much motion is observed, the cellular architecture of the tissue may be strongly distorted and may lead to images that are difficult to interpret.

In most video medical devices, a user will navigate an imaging probe or an imaging detector on or within the patient and will stay onto an area for a time that is correlated to the interest and interpretability of the area.

As such, in some embodiments of the present invention, interpretability may be a function of the motion of the imaging probe with respect to its object. In other words, in some embodiments, interpretability may be characterized in terms of kinematic stability.

In other scenarios, relating interpretability to model-based computational features might be complex to perform. It might however be the case that an external database of images has been previously acquired and annotated according to some interpretability criteria by expert users. In other embodiments of the invention, machine-learning algorithms may be used to infer the interpretability of new images by learning from the available annotated external database.

In still other scenarios, interpretation of a video might rely on identifying the variability of the images acquired with the video medical device. In this case, the user might be interested in having similar images being grouped together. Embodiments of the invention may use other forms of machine learning to characterize the interpretability by clustering images according to their similarity.

Several visualization techniques can be used to display at least one image characterization output, while the user is playing an already recorded video, playing a buffered video, or visualizing the image currently being acquired by the video medical device. For each image stored in the buffer, the computed output value may be discrete information, such as a letter or label, or a continuous scalar or vector value.

As illustrated in FIGS. 1 to 4, the output values may be attached to a timeline 11 of the video, where the timeline 11 comprises a temporal cursor 15 that indicates the time of a displayed image 10 in the timeline 11. According to one embodiment of the invention, colors representing the output values computed for all the images of the video are directly superimposed in the timeline of the video, in order to provide the user with a chronological view of image interpretability within the video. A legend explaining the output values may also be displayed to ease user understanding.

Figure 2:
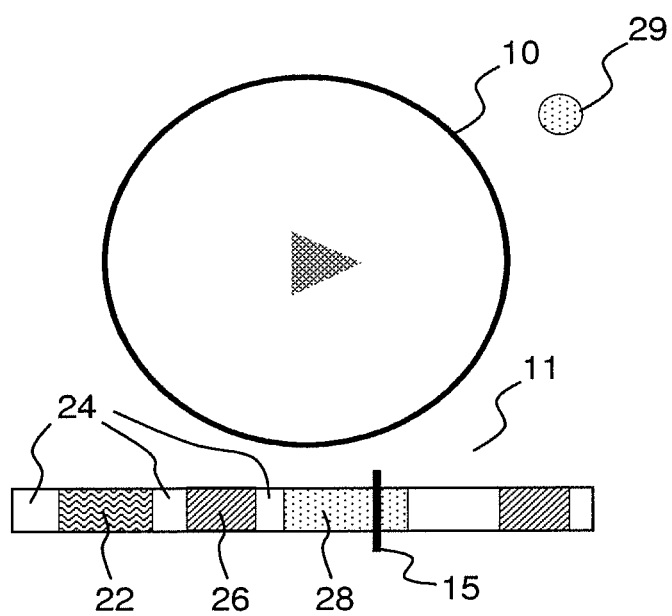
FIG. 2 is a schematic view of video acquired with a medical device being displayed in association with a timeline highlighting temporal regions labeled according to discrete values.

The output value computed for the currently displayed image 10, or a color representing this value, may also be displayed beside the currently displayed image, in order to duplicate the output value potentially hidden by the current temporal cursor 15, as illustrated in FIG. 2 (element 29).

In case of a discretized output, each output value may be represented by one predefined color. FIG. 1 illustrates the case of a binary output represented by a predefined gray 12 or white 14 color in the timeline 11. Gray (respectively white) color at a given position in the timeline may indicate for example that the image at this position in the video is of sufficient (respectively insufficient) quality, or that it is kinematically stable (respectively unstable) with respect to the previous image.

FIG. 2 illustrates the case of an output discretized into four distinct values, each of them being represented by a distinct color: white 24, light gray (dot) 28, dark gray (wave) 22 or black (hatched) 26. If there is an order relation between the output values, this order can be kept between gray levels to which the values are mapped. If not a random order may be chosen. These four gray values may indicate for example four interpretability levels ordered as: not interpretable at all, hardly interpretable, partially interpretable, fully interpretable. They may also indicate for example: not sufficiently interpretable, sufficiently interpretable and belonging to tissue type A, sufficiently interpretable and belonging to tissue type B, sufficiently interpretable and belonging to tissue type C, where there is no order relation between these three tissue types.

Figure 3:
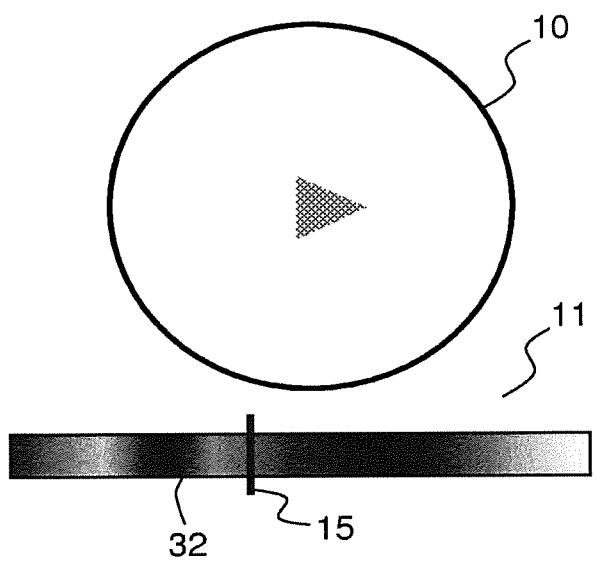
FIG. 3 is a schematic view of video acquired with a medical device being displayed in association with a timeline presenting a temporal evolution of a continuous output.

In case of a continuous output (FIG. 3), each output value may still be represented by a color that can be automatically determined by mapping the output value for example to a RGB, HSL, HSV or YUV triplet value. A lookup table may be used to convert continuous outputs into colors. If the output is a n-dimensional vector with n≤3, the same mapping process can be adapted. If the output is a n-dimensional vector with n>3, the mapping process can be computed for example from a 3-Dimensional Principal Component Analysis. The continuous color value 32 may indicate for example the image quality, or the percentage of local regions in the image that match with a local regions in the previous image. FIG. 3 illustrates how such visualization may allow the user to appreciate the temporal evolution of a continuous image interpretability value within the video.

In the particular case where the user is only visualizing the image currently being acquired, at least one output value may be computed on the fly for this image. Said output value, or a color representing this value, may be displayed beside this currently acquired image.

In many cases, the user of the video data is not only the physician directly but may be a second computational algorithm. We disclose an embodiment of the invention in which the characterized interpretability is used to perform further computations solely on temporal regions of adequate interpretability.

In case of a discrete output attached to the timeline, temporal regions can be defined in the timeline as the largest segments corresponding to consecutive images with equal output value. The current temporal region is defined as the temporal region to which the current temporal cursor belongs. User interactions may then be defined, allowing the user to potentially:

Disable or enable the display of at least one output;

Move the temporal cursor to the closest next time point which belongs to a temporal region distinct from the current temporal region;

Move the temporal cursor to the closest previous time point time point which belongs to a temporal region distinct from the current temporal region;

Select at least one temporal region;

Refine and modify the temporal regions

Store the images associated with the selected temporal region onto a storage device, and potentially annotate them;

Launch at least one second algorithm on the current temporal region, or on at least one temporal region selected by the user. Said second algorithm uses as input the image subsequence(s) associated with the temporal region(s). A second algorithm may for example consist in classifying or mosaicing these input image subsequence(s).

Visualize at least one output created by at least one second algorithm, said second algorithm being potentially automatically launched on the current temporal region. Advantageously, this second output may be automatically displayed, without requiring any user interaction.

In this scenario with a second algorithm, the interpretability can also be defined in terms of how the data is used by the subsequent computations. Dedicated video mosaicing techniques can be used to widen the field of view of a video by aligning and fusing many consecutive images from a video sequence. This process only works if consecutive images share a sufficient overlap and if some motion between the imaging device and the object of interest is observed. In one embodiment of the invention, interpretability may be defined in terms of kinematic stability and video mosaicing tools may be applied on the regions of sufficient interpretability.

According to another embodiment, if video mosaicing has been applied on at least two video subsequences to produce larger field of view images, image mosaicing technique may subsequently be used to detect and associate matching image mosaics, spatially register them and fuse them so as to create even larger field of view images. The detection of matching mosaics may also depend on user interaction.

To ease the interpretation of video sequences acquired with a video medical device, content based video retrieval tools can be used as a means of leveraging similarity-based reasoning. For a given video sequence, the physician may be presented, from an external database, a set of cases visually similar to the video sequence and previously annotated by experts. Video sequences acquired with a medical device may contain parts of variable interpretability, and may contain a mix of different tissue types. As such, the relevance of these content-based video retrieval tools may critically depend on choosing, as request, a portion of a video which is consistent in terms of interpretability. In one embodiment of the invention, interpretability characterization is used to automatically split an input video into sub-portions of sufficient interpretability; said sub-portions being used to construct at least one query for a content-based video retrieval algorithm.

According to one variant, the sub-portions may be used in different manners to create the query for the content-based retrieval algorithm. For example, each sub-portion may be used to create an independent query. Alternatively, the entire set of sub-portions may be used to create a single query. Still alternatively, the user may be required to select a subset of these sub-portions to create a single query.

According to another variant, the user also has the ability to refine the temporal segmentation provided by the first algorithm before resuming to the second algorithm.

Figure 4A:
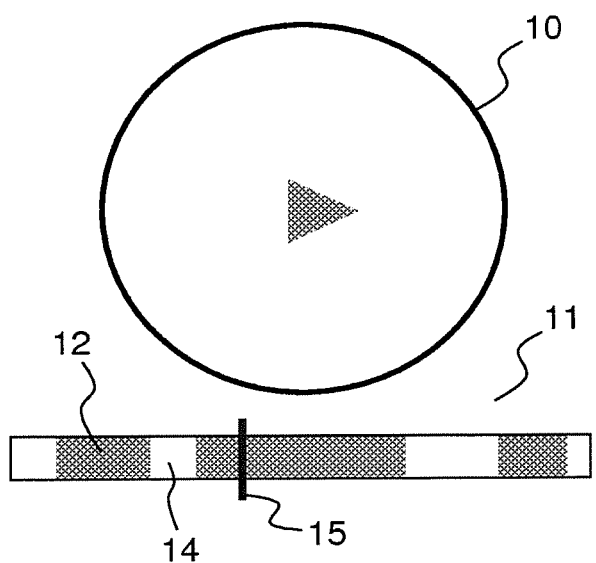
FIG. 4A is a schematic view of a video acquired with a medical device being displayed in association with a timeline highlighting temporal regions of sufficient interpretability and FIG. 4B illustrates a set of cases comprising video and additional metadata that have been selected from an external database according to a similarity criterion with respect to the current temporal region.
Figure 4B:
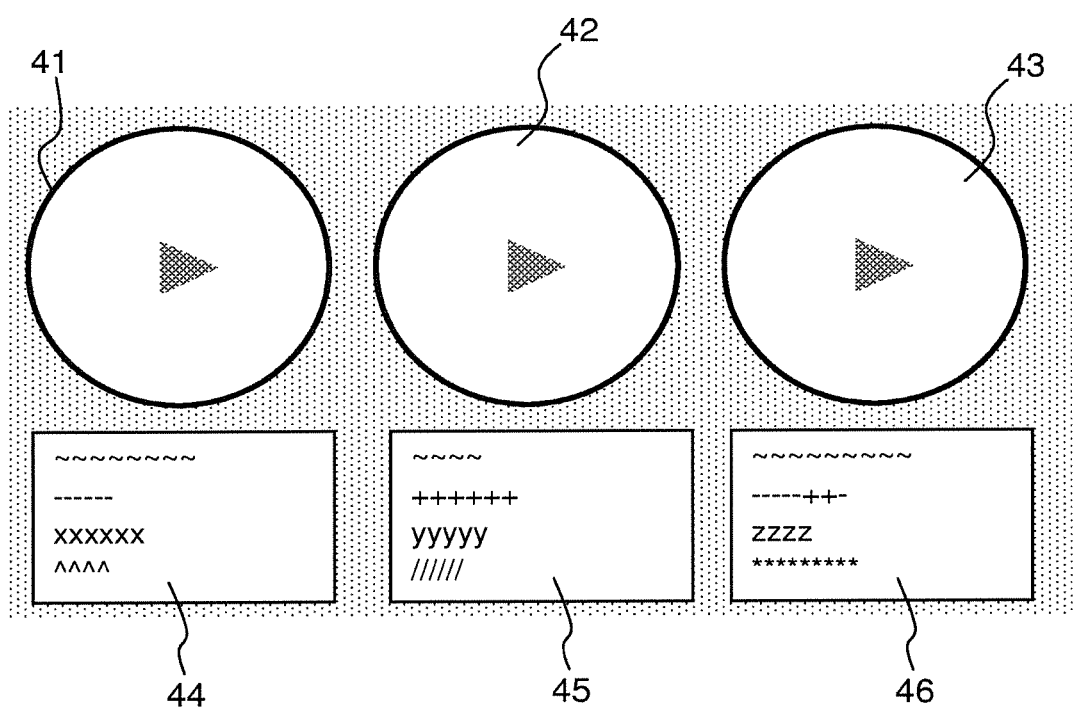

FIG. 4A and FIG. 4B illustrate the case where the second algorithm is a content-based video retrieval processing that has been launched on the current temporal region of the video of interest. The output created by this second algorithm and displayed to the user consists of three reference videos (41, 42, 43) together with their annotations (44, 45, 46), where the annotations include for example the diagnostic class of the reference video. These reference videos have been extracted from an external database as the most visually similar to the set of contiguous images associated with the current temporal region selected by the cursor 15 in FIG. 4A.

According to another embodiment, in the case of discrete labels, the invention also allows to automatically run a second algorithm on each of the regions.

According to another embodiment, in the case of discrete labels, the invention also allows to automatically store the content of all labeled regions independently, or in the sub-case of binary labels, to store on a storage device the concatenation of all temporal regions corresponding to a given label.

Kinematic Stability

Image registration-based approaches can be used to identify kinematically stable temporal regions within video sequences. This can for example be done by actually registering temporally consecutive images and then analyzing the quality of the spatial transformation found by the registration algorithm.

Another example would be to use only a subset of the steps of an image registration algorithm and analyze the quality of the results provided by this subset. This can be done in the case of feature matching-based algorithms where looking at the consistency of the feature matches with a spatial transformation model could allow one to infer information about kinematic stability.

The same feature matches may also be analyzed in terms of local consistency so as to obtain a result that is more robust to modeling error for the spatial transformation.

More advanced methods registering multiple images at the same time, such as the one presented in (Vercauteren, Perchant, Lacombe, & Savoire, 2011) may also be used to infer kinematic stability.

Figure 5:
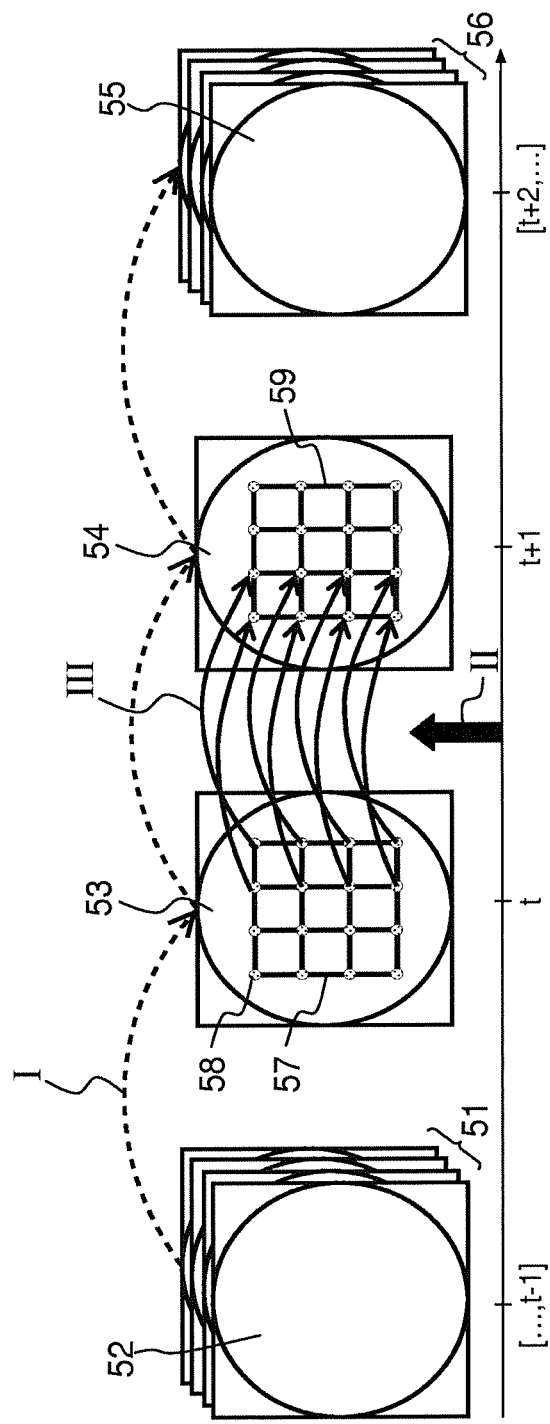
FIG. 5 is a diagram illustrating matching of consecutive images and thresholding based on matching quality.

FIG. 5 illustrates in more detail one possible embodiment for analyzing kinematic stability relying on a grid of features. Each image 52 of a series of sequential images 51 stored in the buffer in the buffer is associated with a grid (57) of spatial locations on the image (step I). Each point (58) of the grid (57) is associated with a local spatial region with a given scale around that point, each region in turn being associated with a descriptor, or numerical signature. Matching each descriptor from one image to a numerically similar descriptor from the previous image (step III), allows one to match each point of a grid (59) in an image (54) to another point on a grid (57) of the previous image (53); said matched points are associated with local regions that are visually similar thanks to the descriptor being similar. Analysis of the matches is then performed to evaluate their local consistency or their consistency with respect to a predefined spatial transformation model. If the consistency is estimated to be too low, the image will be considered as kinematically unstable with respect to the previous one.

Representing an image as a grid of descriptors is often referred to as dense local image description or dense description in short. Interchangeably, we may also use the term grid-based for these approaches. Each point of the grid may also be referred to as a keypoint.

One advantage of relying on grid-based local image description, is that the same descriptors may be used both to characterize the stability of video sequences and to perform content-based video retrieval task. This would allow to save computational time in the case where both tasks are to be performed.

Local image description, grid-based or not, is widely used in computer vision, pattern recognition and medical imaging and has served a variety of purposes. Many different descriptors are now available including but not limited to LBP, SIFT, SURFT, HoG, GLOH and the like. Depending on the exact application, different computational requirements, performance requirements, ease of implementation requirements, etc., may lead to each option.

Keypoint localization is sometimes crucial in computer vision. In most cases, a regular grid of keypoints is not the most common choice. In some scenarios, it is advantageous to have keypoints being precisely located on the most salient points.

Typically, first and second derivatives of the image may be used to detect the most salient points as well as to estimate the scale of the corresponding local region. The well-known Harris detector for example uses the trace of the Hessian matrix to detect corners. Other detectors uses a Laplacian estimator which is the determinant of the Hessian matrix. Once the most salient points are detected, keypoints can be set on the corresponding locations with a scale provided by the saliency detector.

As in the grid case, keypoints derived from salient points can then be used to compute local image descriptors. A discrepancy measurement may then be computed between descriptors, resulting in keypoint matches, which may be analyzed or regularized by a transformation model. Example transformation models include, but are not limited to, projective models well suited for camera applications, translation models and rigid-body transformation models both being well suited for microscopy applications and deformable models that can encompass tissue deformation.

Keypoint matching methods typically have several constraints. For example, it is often the case that good matching performance mandates keypoints to be localized on sufficiently salient points but also to be well distributed over the image field.

Having the keypoints located on sufficiently salient points will typically make the localization of the keypoints more robust with respect to change of the imaging parameters. This may therefore improve the performance of the registration algorithm by making the keypoint matching more accurate.

During the keypoint matching process, it is often better to have a single response while trying to associate a keypoint with many others. It is also often desirable to avoid having spatial regions in the image without keypoints. This calls for a good distribution of the keypoints.

It is also often advantageous to choose descriptors that are invariant under different acquisition effects including but not limited to:

Intensity changes. The observed image signal may indeed change depending on global and local light reflection, on power of the illumination, on photobleaching effect, on imaging artifacts and so on.

Spatial distortions. The observed morphology of the described area may change depending on the point of view; the tissue may change between different images because of respiration, heartbeat, contact with instruments; the user may change the zoom of the instrument; the device may produce artifacts and so on.

In some scenarios, the description and discrepancy measurement process may benefit from mimicking human vision as close as possible. It is at least most often advantageous to choose a description-discrepancy couple sufficiently relevant to correctly associate region from one image to another most of the time.

Although salient point detection followed by standard local region description answers most of the constraints in several applications, it has been shown to fail finding well-distributed salient regions on many different medical imaging problems. Medical images are indeed often smooth but textured and lack the edges of corners that many computer vision specific tools require.

To answer these constraints in the context of medical imaging, applying a grid-based description at fixed scales on medical images is often an interesting choice. Information may indeed be distributed everywhere in many medical images.

Relying on grid-based description for registration purpose is often thought as a challenging task. Compared to saliency-detection-based methods, the choice of the description-discrepancy couple has more impact of the matching accuracy. It also generated a significantly larger number of outlier matches that needs to be handled by the method.

Some imaging scanning devices that are used in the clinical field may also lead to rather strong motion artifacts. If the tissue is in contact with an imaging probe, this may result in complex to predict or unpredictable deformations.

In the following, we focus on one example descriptor, the SIFT descriptor that has been shown to be efficient on some medical imaging problems, to illustrate some of the concepts of local image descriptors. It should be recalled that any other local image descriptor may be used.

The SIFT (Scale Invariant Feature Transform) algorithm includes both keypoint detection and image description. With the grid-based description approach, keypoint detection may not be required and only the descriptor part of SIFT may be used.

Gradient information can be used to describe a local region of an image. More specifically, histograms of oriented gradients have shown efficient results. Within a local image region, a histogram may be created in different sub-regions of the local region to sum up the magnitude of the gradients in the sub-region according to some discretized orientation bins. The entire local image region may then be described by one final histogram that concatenates all sub-region histograms in a pre-defined order.

The notion of windowing also often plays an important role to better weight the contribution of gradient magnitude over the descriptor. Windowing is typically applied on the entire descriptor. Gaussian kernels are the most common windowing choice but any other type of window (Blackman, Hamming, Cosine . . . ) may be used.

Gaussian windows have an infinite support, a practical implementation of it may rely on truncation or more complex forms of approximations such as recursive filtering. In many cases, it can be advantageous to truncate the support of the Gaussian window after a distance that depends on the standard deviation $\sigma$ of the Gaussian window. Typically, the truncation distance r can be chosen to be proportional to $\sigma$. It is for example classical to use $r=\sigma/2$ but any other relationship could be used.

Once a windowing strategy has been defined, the windowing values can be used in the creation of the descriptor by weighting each gradient information according to the windowing function during the final histogram creation.

In some cases, it might be advantageous to obtain local descriptors that are invariant under any rotation of the image. This may be achieved by many different means including, but not limited to:

finding a mode or mean of the orientation within the entire local region and reorienting the region or the gradient values according to this principal orientation using circular-shaped bands to subdivide the local region in sub-regions Defining a principal orientation for the descriptors region may for example be done by computing a first gradient orientation histogram on the entire local region of the descriptor. This histogram creation process may be different than the sub-region histogram creation one, for example:

the number of angular bins used to compute the principal orientation may advantageously be larger than the number of angular bins used to compute the sub-region histogram. This may permit to have a more accurate re-orientation strategy potentially leading to a higher invariance with respect to rotation changes.

a different windowing function might be used to weight the contribution of each gradient sample.

If principal orientation is defined as a mode of the orientation histogram of the entire local region, the highest peak in this gradient histogram will provide the value of this principal orientation. Similarly a mean value may be wanted, in which case using a Fréchet mean on the orientation histogram might be advantageous to take into account the wrapping of angles at 360°. Finding the peak may also benefit from using a certain form of regularization by fitting a local model such as a spline or a Gaussian to identify the location of the peak with sub-bin accuracy and in a potentially more robust manner.

If a mode is used for the definition, we may also want to use several different modes to create several descriptors, one per selected mode. Selecting several modes can for example be done on the basis of a comparison between the highest peak and the secondary peaks. If the height of the secondary peak is sufficiently close to the highest one, for example above some fraction of it, it might be interesting to keep it. Determining the corresponding threshold might be done through different means, including but not limited to rule of thumb, trial and error, cross-validation, optimization and the like.

Once the principal orientation is given, sample gradient orientation values can be distributed in the gradient histograms of the sub-regions using angular difference and tri-linear interpolation. As such, position and angle of samples may be taken into account during the interpolation.

One advantage of using a circular truncation and a circularly symmetric windowing function is that it may save some computational time by allowing avoiding checking whether a sample is inside or outside the truncation region after the re-orientation.

It should be noted that re-orientation is not always a necessity. For example, if it can be assumed that if no, or very little, noticeable rotation between consecutive images of the video can be observed, rotation invariance may be useless or even detrimental as it may lead to higher computational requirements. Absence of noticeable rotation in consecutive images is for example the standard case in endomicroscopic videos. Indeed, the imaging probes typically have a high resistance to torque. Rotation of the imaging probe with respect to the tissue can therefore often be neglected.

One important notion in local descriptors is the determination of at least one scale of observation. This scale may be automatically defined of may be fixed thanks to application-specific knowledge. In the context of keypoint detection, scale is typically determined during the detection process. In the context of grid-based approaches, fixing a predefined-scale might appear as a more natural choice. However, other choices might be made.

As mentioned above, choosing a predefined scale can be done according to application-specific knowledge. For example, when using endomicroscopy, it might be advantageous to use a scale or scales that is or are related to anatomically meaningful scales, such as a few microns to focus on a few cells only, a few tens of microns to focus of cellular architecture patterns and so on.

According to another embodiment of the invention, at least one optimal scale may also be detected either of a training database of on the entire set of images by optimizing some form of intra-image energy at the given scale or by optimizing the average saliency across the entire image at the given scale.

Once a scale is given, it might be advantageous to resample the local image region to an image patch with a given fixed pixel size. This may be done with standard scale-space approaches. A typical scale space transformation of an image $I(x,y)$ can be defined by $L(x,y,s)=G(x,y,s) \circ I(x,y)$ where s is the scale factor and $\circ$ is the convolution operation in x and y, and G is a 2D Gaussian function. This scale-space is used to smooth the local regions before down sampling them to the desired fixed size.

It might be advantageous to consider that input images are already naturally smoothed by a certain $\sigma_0$ arising from some parameters such as the quality of the optics, the image reconstruction process, etc. The value of the standard deviation used for smoothing the images before downscaling may account for this natural smoothing, for example by using $\sqrt{(s-\sigma_0)}$ instead of s directly.

When a grid-based approach is taken and a fixed scale of observation is provided, it might be advantageous to choose a grid step that is sufficiently small to capture all possible structures which actually exist in the image but sufficiently large to reduce computational requirements.

One advantageous choice can be to choose a grid step to be proportional to the scale factor. To reduce the computational cost, it might also be advantageous to choose an integer proportionality factor. This way, resampled pixels and samples for the local descriptor will be co-localized. One step of sample interpolation may thus be avoided.

Although a grid approach often shows accurate and efficient results, in some scenarios, it might be advantageous to refine the matching results from the grid. Indeed, the accuracy of a match is limited to the grid step. Reducing the grid step is an option but this is at the price of increasing the computational cost. In one embodiment of the invention, a form of dithering can be used on the grid point positions to randomize the quantization error and thus lower its average.

Figure 6A:
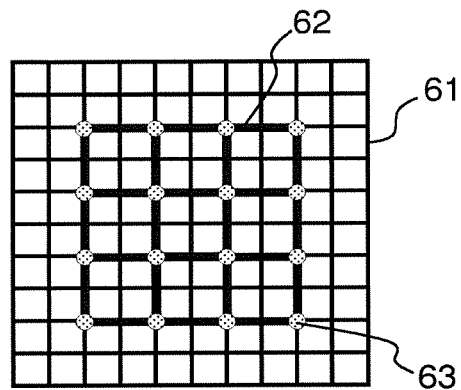
FIG. 6A and FIG. 6B are diagrams illustrating a refinement strategy for positioning local image descriptors.
Figure 6B:
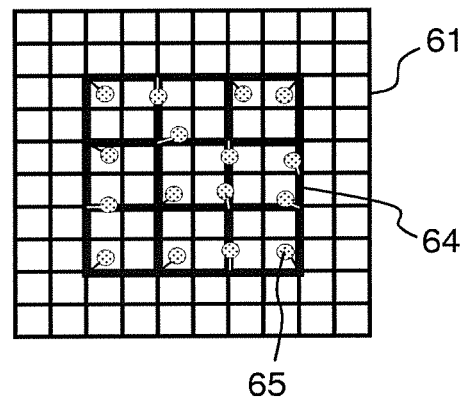

As illustrated in FIG. 6, intentional noise can be added to the regular grid (62) point positions 63 to create a disturbed grid 64. Preferably, the standard deviation of this noise would be less than a fourth of the original grid 62 step to keep the point positions 65 of the disturbed grid 64 sufficiently close to the original one. This is potentially important to ensure a sufficient coverage of the entire image.

In another embodiment, original points would be seen at seed points, which could each generate several points with different instances of noise. Choosing one noisy instance per seed point would lead to a simple disturbed grid but choosing higher number of instances might be beneficial.

In still another embodiment, the noise added to the grid point locations would not be made at random but would be driven by the saliency map corresponding to the underlying image. Starting from an original regular grid of points, each grid point would be attracted by nearby salient image points as well as being attracted by the original location. The competition between the two attractions would define the final position of the disturbed grid point. Similarly, we could also add a repulsion term between the grid points. With this approach, the descriptors would be well distributed over the image but would also focus on salient points within the image, potentially making the matching more accurate.

In more detail, according to one example setup, the attraction to the original grid point could be binary with no attraction as long as the point is within a bounded circular region and infinite attraction when the point is outside of the bounded region. If no grid points repulsion term is used, the grid point would then end up being co-localized with the most salient image point within the bounded region.

The derivation of the image saliency map can be done using standard saliency criterion, such as but not limited to second-order derivative-based criteria or information theoretic criteria.

As illustrated in FIG. 5, once an image description 54 is available, the descriptors 59 of this image can be matched to the descriptors 57 of the previous image 53 in the buffer. The set of matches (II) can now be analyzed to evaluate whether the motion was stable or not between these two images.

To find good descriptor matches, one possible choice is to rely on the k closest descriptors as provided by a discrepancy measurement. Several algorithmic approaches to leverage closest points are disclosed.

To measure the discrepancy between two descriptors, Euclidean distance would be the simplest choice, often producing sufficient results. Other discrepancy measurements relying on distances, pseudo-distances or more ad-hoc algorithms may however be used, including but not limited to $\chi^2$, Mahalanobis distance, Earth Mover's Distance (EMD), and the like. In some scenarios, using such discrepancy measurement could potentially lead to better results for feature matching purposes.

Euclidean distance is widely used to compare any points of any dimension. However, descriptors may be normalized and could for example represent the local distribution of gradients within a region of interest. In this scenario, the discrepancy measurement between the descriptors could benefit from relying on probability density related distances such as the EMD.

Even in the above case, Euclidean distance or squared-Euclidean distance may be of high interest for computational reasons.

Given a discrepancy measure, we may compute every possible pairwise discrepancy between two sets of descriptors. This allows for the creation of a discrepancy matrix D, where $D(i,j)$=discrepancy($i^{th}$ descriptor from $1^{st}$ set, $j^{th}$ descriptor from $2^{nd}$ set). This poses two potential problems. The first one is that of computational complexity to create the D matrix. The second one is that this process may generate a large number of outliers. Improving both aspects would be useful. To reduce the computational cost, we may for example tolerate some error on the matching by relying on approximate nearest neighbor tools rather than exact nearest neighbor. To reduce the number of outliers, it is for example possible to validate each match before adding it to the list of useful matches. Such step may require not only to focus on the closest match but also to look for the k closest matches.

Looking at computational complexity of the brute force approach, if we consider looking for the k best matches over two sets of N descriptors, each descriptor having the same size n, the complexity of the brute force k-nearest neighbor (k-NN) search algorithm is exactly $O((C(n)+k) \cdot N^2)$, $C(n)$ being the cost of the discrepancy measurement. In the case of Euclidean distance, $C(n)$ is roughly equal to n. The cost to partially sort each row in order to get the k better results is $O(kN)$ on average. The complexity of the exact search is thus $O((n+k) \cdot N^2)$.

To reduce the computational complexity, approximate nearest neighbor techniques may be used. This reduction may for example be achieved by relying on data partitioning. A binary n-d tree is built to separate points of dimension n. This is recursively done for each child until the cardinal of point of a leaf reaches one. Building this tree while using a median-split as clustering has a linear complexity of $\theta(nN \log_2(N))$. It should be noted, that any clustering method could be used to split data into the binary tree. Commonly, a simple median-split is typically used but hierarchical K-means or other clustering algorithms are also widely used for this specific application.

Once the n-d tree is built, the search algorithm goes from the top of tree to a final leaf to reach the first closest point. The complexity to approximately search the k closest points of N queries is about $O(kN \log(N))$. The complexity of n-d tree construction and approximate search in the n-d tree is: $O((n+k)N \log(N))$.

In the basic mode of operation, we could for each pair of images to match, build the n-d tree for the first (respectively second) image and match each descriptor from the second (resp. first) to its k closest descriptors in this n-d tree. Both orders may also be performed concurrently if required.

To further save computational time, it can be advantageous to build one n-d tree only every two images. This can be achieved if we can choose which of the two images is used to create the n-d tree. Indeed, we can start by choosing the second image for the creation of the n-d tree, then, when a third image is to be matched to the second one, the n-d tree for the second image would be used as it is already available. When the fourth image is to be matched with the third one, a new n-d tree would be built for the fourth image and so on.

For the purpose of transferring a n-d tree from one image pair to the next, the invention advantageously may make use of the internal database introduced earlier.

Given the brute force approach or more advanced ones, each descriptor in the first set can be associated with the closest descriptor in the second set. This matching is not necessary symmetrical. Symmetry checking feature can advantageously be used to validate a match and thus to remove outliers. Given the best match, in the second set, of a descriptor from the first set, if the closest descriptor, in the first set, to the descriptor of the second set is exactly the same descriptor as the initial one from the first set, then, the match would be validated. An implementation of symmetry checking may benefit from building and storing one n-d tree per image.

Although symmetry checking may allow removing many outliers, it may be beneficial in some cases to further refine the outlier removal. Eliminating most of the wrong associations would permit producing easier, more accurate and more robust analysis of the matches. Typical cases leading to wrong matches include but are not limited to:

Out of overlap descriptors. For any non-trivial spatial transformation relating two consecutive images, although there might be an overlap between the consecutive images, there will in most case be spatial regions in the first image that do not exist in the second image. For those descriptors in the non-overlapping regions, there exist no good descriptors in the other image to be associated with.

Flat descriptors. Regions with very little contrast or flat regions in the image do not have any reliable gradient information. Distribution of gradient is homogeneous, driven by the inherent noise of the imaging system. This may lead to random matches between the flat regions. The same problem may appear in a less stringent way for regions that only show contrast along a single direction. This is the so called aperture problem.

It should be noted that the symmetrization disclosed above may help in removing many outliers in these two categories. There are however cases for which other methods may be more beneficial. Some imaging devices may indeed create a static noise pattern on top of their images due to calibration inaccuracies, vignetting effect, scratches on the optics and so on. In this set setup, images with no useful contrast still have a small contrast arising from any of the aforementioned artifacts. Flat regions may therefore not be completely flat. Weak gradient information from that static noise may then be taken into account while associating descriptors. These bad matches will potentially not be removed by symmetrization and will bias the matching towards the identity.

To determine if a match is reliable, ratio analysis between the discrepancy of the current descriptor with its closest descriptor in the other set and the discrepancy with its second closest descriptor has been proposed. While this works well in practice when keypoint detection is used, this fails to work properly in the grid case where overlapping regions may be described and may thus have similar descriptors. Keypoint detection may lead to descriptor positions ensuring that all local regions describe almost non-overlapping regions within the input image. When using a grid-based image description approach, regions covered by descriptors may have a non-negligible overlap. There are for example cases where around 80% of overlap appears to be beneficial. It would then mean that the descriptors of two spatially neighbor local regions could be similar. Therefore the closest descriptor and the second closest one could in turn have very similar discrepancy with the current descriptor.

According to one embodiment of the invention, ratio analysis between the discrepancy of the current descriptor with the closest descriptor in the other set and the discrepancy with the $k^{th}$ closest descriptor can be used. The choice of k has to be made keeping in mind the structure of the grid. For example choosing k=5 (resp. k=9) ensures that the direct 4-connected (resp. 8-connected) grid points to the best match are not taken into account. A threshold on this ratio may allow removing many outliers while keeping most of the inliers in.

Such ratio analysis should provide usable results because comparing a correct match with the closest incorrect one should lead to much higher difference than comparing an incorrect match and the closest other incorrect match. Standard approached have used the first closest match as a comparison point while we disclose using the $k^{th}$ one to avoid taking into account almost all correct matches from regions having high overlap with the correct match. As mentioned above, it is beneficial to adapt the parameter k depending on the density of the descriptor grid used. The denser the grid is, the further we need to look for the second descriptor used in the ratio.

According to another embodiment of the invention, it is also possible to remove all the matches with a discrepancy above a given threshold. The threshold can be a globally predefined one, can be computed globally for a given pair of images based on the observed statistics of the discrepancies, or can be computed locally based on the discrepancies observed in a local neighborhood of a point. More complex options taking into account the actual content of the local image region descriptors may also be imagined.

Given a pair of consecutive images and set of filtered matches, we may now proceed with their analysis to evaluate the kinematic stability from one image to the other.

According to one embodiment, the analysis of the matches would be performed as such: the matches would vote within a set of discretized spatial transformation parameters, thus creating a vote map. The parameters that have a sufficient number of votes would be considered as consistent votes. The percentage of consistent versus inconsistent votes could then be used as a confidence evaluation for the kinematic stability.

Given a pair of consecutive images and set of filtered matches, we may also want to estimate a spatial transformation that allows registering, or aligning, the images. For medical images, such registration is often a potentially challenging task due to, but not limited to, some of the following reasons.

When imaging the same tissue region at different time points, the observed image signal may vary due to specular reflection, photobleaching, changes in vascularization or oxygenation, changes in the amount of excitation light and so on.

Occlusion might occur due to the presence of other instruments, of blood and other biological liquids, smoke, feces, etc.

The tissue structures can also be deformed due to the respiration, heartbeat, patient motion or contact between tissue and instruments, including the imaging probe. Local deformations may thus need to be taken into account while registering two consecutive images.

The imaging device may also generate its own motion artifacts that may in some cases be too complex to be properly modeled for the task a pairwise image registration. For example, in the case of an imaging scanning device, scanning of the imaging field of view for a given image may be performed thanks to mirrors. This implies that each pixel may be acquired at a different time. When the imaging probe is moving with respect to the tissue, it may cause strong distortions that are varying within the field of view. In some cases, if the motion of the imaging probe with respect to the tissue is constant while acquiring a image, the distortions can be modeled and compensated for. However, in most cases the motion of the probe is more complex and cannot be easily modeled especially if the motion evolves rapidly.

In some scenarios, the imaging device relies on image reconstruction and calibration information to produce its images. The calibration may have inaccuracies and may even change over time. This may lead to either a static noise pattern that may bias the image registration or to a change in the visual appearance that may complexify the task of image registration.

In most cases, the imaging device has no tracking information that would be helpful to guide the image registration process. Also, even when tracking information is available, the accuracy of it might be quite large in comparison to the field of view. This would be especially true in the field of Endomicroscopy but would also hold for most imaging device because of patient motion.

In some cases, even though the above reasons still exist, their impact on the images could be sufficiently small that we can directly estimate a spatial transformation between the images and analyze the result to decide on the kinematic stability. In other cases where the same reasons have a higher impact on the images, such an approach may only work for a small percentage of image pairs. This may therefore lead to a bias towards instability in the estimation of kinematic stability. Indeed many pairs of images could potentially not be properly registered although the overall motion between the images could be considered as smooth.

According to one embodiment of the invention, we focus on cases for which finding a spatial transformation model is sufficient to estimate kinematic analysis. The spatial transformation could be any of the classical or less classical models including, but not limited to, translations, rigid-body transformations, affine transformations, projective transformations, translations with shearing to account for motion distortions and so on. In this scenario, the matches may serve as input data to fit the transformation model. Optimization-based schemes such as gradient descent, simulated annealing and the like or random sampling schemes such as RANSAC, MSAC and the like, least-squares fitting, least-trimmed squares, weighted least-squares fitting, $L_1$ fitting and the like may all be used. Hierarchical fitting approaches, such as those that progressively refine the spatial transformation model, may also help providing more robust results.

Kinematic stability may then be evaluated by looking at the number of inliers for the final spatial transformation model and comparing it to the total number of matches or the total number of kept matches.

Kinematic stability may also be evaluated by using the final spatial transformation and computing a similarity score on the region of overlap between the images after warping the target one onto the other one. The similarity score may be one of the standard or less standard similarity scores used in medical imaging including, but not limited to, sum of squared differences, normalized correlation, mutual information, normalized gradient field and the like.

In this case, kinematic stability is evaluated by a registration similarity score. It should be noted that a direct approach to registration that optimizes the similarity score is also possible and might in some cases lead to better results. In some other cases, even if kinematic stability is evaluated in terms of similarity score, going through the feature matching route may lead to more robust results that are less prone to being trapped in local minima. Depending on the exact implementation, computational costs might also largely vary depending on the chosen route.

Although fitting a transformation model to the matching data can in some cases be really efficient, there might be cases where defining the model is too complex to be usable in practice. According to another embodiment of the invention a more local approach to analyzing the matches between two consecutive images for kinematic stability can be used. Advantageously, the invention allows to not focus on the exact model of spatial transformation but to evaluate the probability to have a fairly spatially consistent spatial transformation between images. For this purposes, a similarity score that relies on the local translations provided by the descriptor matches is proposed.

According to one embodiment of the invention, a similarity score between consecutive images can be created through a vote map. The vote map is a 2D histogram that sums up the contribution of each local translation found by the matched descriptors. Contribution can be weighted by a function of the discrepancy between the two matched descriptors, by the quality of the association or can simply all have a unit weight.

The vote map uses discretized voting bins. Advantageously, in the case of a regular grid for image description, the resolution of the vote map can be chosen to be equal to that of the description grid. In this case, the size of the vote map will typically be twice that of the grid to allow for all possible translations from one grid point in the first image to another grid point in the other image.

In the case of a perturbed grid or in the case of keypoint detection, choosing the resolution of the vote map can be done according to the required accuracy.

It should be noted that the overlap between two images depends on the amplitude of the translation. Because of that, not all translations can receive the same maximum number of vote. Actually, in a simple setup, only the identity transformation may receive all votes. If we consider a translation of half the field of view in one dimension and if we use rectangular images, the overlap will correspond to half an image meaning that only half the matches can vote for the correct translation.

To account for this potential bias, the vote map can further be weighted according to the maximum number of potential voters per voting bin. Advantageously, the maximum number of potential voters for a given translation in the vote map may be computed thanks to a convolution of two mask images that represent the spatial organization of the grids used for image description.

In some imaging devices, the field of view of the images is not square but may typically be of circular or any other form. To compute the normalization of the vote map, a mask image where all valid descriptor positions are filled with one and invalid ones with zero can be created.

After convolution of the masks, we obtain a contribution map containing the ratio of potential contributors over the maximum number of contributors for each possible translation. The values are between 0 and 1. According to one embodiment of the invention, we may want to consider only the translations that can be voted by a sufficient number of descriptor matches.

The vote map may be normalized as such. Each entry in the vote map get either divided by the value of the contribution map if the value of the contribution map is above a given threshold or get assigned to 0 otherwise (i.e. if the value of the contribution map is below the threshold).

Once the normalized vote map is computed, in the case where the spatial transformation can be well represented by a translation, we will typically observe a main peak in the vote map around the expected translation.

In case of more complex spatial transformations, including non-linear ones, many peaks will typically appear in the vote map, normalized or not. According to one embodiment of out invention, all peaks are taken into account to evaluate kinematic stability. For this, a simple threshold on the values of the vote map can be done to select all votes that are sufficiently consistent. All the values in the vote map that correspond to selected consistent votes can then be summed up to evaluate an overall consistency related to kinematic stability.

The previous approach may ensure that only translations that are shared on somewhat extended local image regions are taken into account. Although this may cover most of the important transformations we need, in some cases, a more refined approach might be required. According to another embodiment of the invention, a match will be selected according to the following rule. Given a neighborhood of matches, a robust estimation of a simple transformation model is performed. The center match for this neighborhood may be selected depending on its distance to the model transformation. This way only locally consistent matches are kept to evaluated overall consistency.

Advantageously, depending on the model of local spatial transformation, such selection may be performed by relying on a simple smoothing, filtering or regularization of the displacement field produced by the matches.

Once spatial transformation consistency between consecutive images is computed, a simple threshold on the consistency may be used as an indicator of kinematic stability.

To further reduce the computational complexity, a multi-scale approach may be employed. As a first step, a coarse grid of descriptors may be used. While the lower granularity means the estimations derived from this grid are less accurate, the decrease in the number of descriptors makes the algorithm run much faster. Given the result found using the coarse grid, we may already detect easy to match image pairs and easy image pairs that cannot be matched. For the image pairs that are not easy, we may run the algorithm using the fine grid. Advantageously, we may decide to use fairly conservative rules to distinguish easy image pairs.

Instead of using a coarse grid and then a fine grid for comparison, the invention allows to achieve similar speed-up if the internal database is used to save the n-d trees built from the fine grids. If this is done, a coarse grid on one image can be matched efficiently to the fine grid of the other image. This is advantageous because using two coarse grids of descriptors, means that the discretization error is increased. There might thus be a chance that the grids are too severely mis-matched and that the algorithm might not correctly indicate a pair of stable consecutive images. However, by using one fine grid of descriptors, the discretization error is kept similar to the complete fine grid case. It is only the noise on the vote map that will be higher when using one coarse grid.

If several description scales are used the same procedure may also be applied in a standard multiscale fashion moving from the coarsest scale to the finest one and stopping whenever a scale allows for making a confident estimation of kinematic stability.

According to another embodiment, several scales may be used concurrently to create a multi-scale vote map on which the above analysis can be extended by working on multi-valued analysis.

Beyond stability of consecutive image, the notion of kinematic stability may preferably also cover the idea that stable sub-sequences should not be restricted to only one or a few isolated images and that stable subsequences separated by only one or a few unstable images should be joined.

Figure 7A:
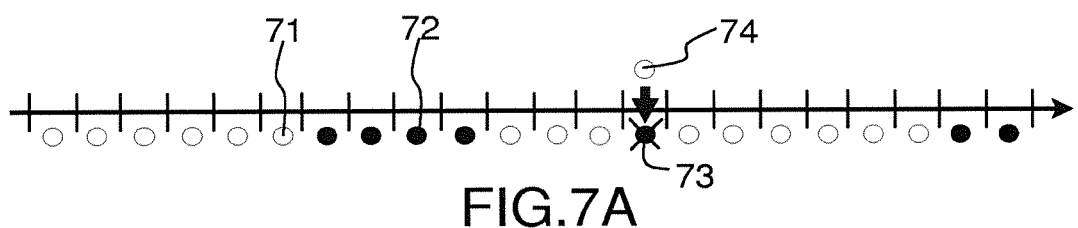
FIG. 7A and FIG. 7B are diagrams illustrating the processing of an initial interpretability label timeline for outliers removal.
Figure 7B:
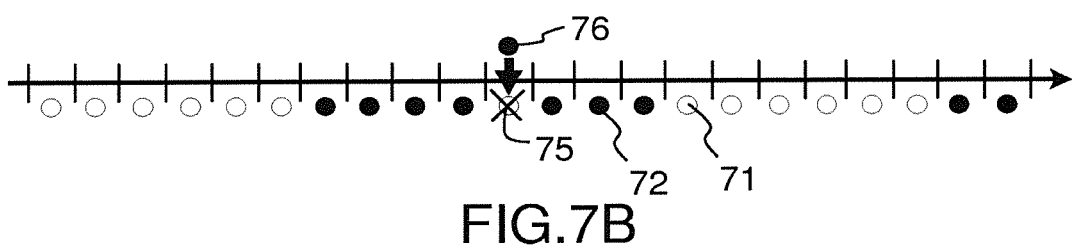

For this purpose, as illustrated in FIG. 7A and FIG. 7B, according to one embodiment of the invention, mathematical morphological operations in the temporal domain can be used. If analyses of consecutives images led to a timeline with a binary information (71, 72) of kinematic stability, a morphological closing operation (illustrated in FIG. 7A) may be used to fill small gaps (73) between stable subsequences while a morphological opening operation (illustrated in FIG. 7B) may be used to remove stable (75) but too short subsequences.

As illustrated in FIG. 7A and FIG. 7B, this approach may allow avoiding some of the false negatives and false positives in our initial temporal segmentation.

Instead of binarizing the result of the image-pairs kinematic stability analysis before the mathematical morphology operations, the invention also allows for using signal processing tools directly on the continuous output of the kinematic analysis. Simple Gaussian smoothing, grayscale mathematical morphology, iterative methods, graph-cuts and the like may be used for this purpose. For the graph-cut approach, one potential embodiment would use the continuous kinematic stability analysis (or a transfer function of it) between two consecutive images as a regularization factor (smoothing term), and could use, as data term, a constant factor, a pre-processing result or any other data-driven signal such as the standard deviation of the image or the matches and the like.

Use of an Advanced Internal Database

According to one embodiment, the invention may process the currently acquired image on the fly. An internal database that is initially empty may be created and progressively enriched by the result of the on-the-fly processing of the previously acquired images. This internal database may be updated upon at each update of the image buffer.

The internal database may store intermediate results that may be computed at the region level, at the image level or at the video subsequence level. Said intermediate results may include but are not limited to:
  global and local visual features;
  global and local inter-frame similarity distances;
  global and local displacement fields;
  visual words built from visual feature clustering;
  visual signatures;
  similarity distances between video subsequences;
  similarity distances from video subsequences of the video of interest to videos of an external database;
  a posteriori knowledge information extracted from an external database containing already acquired and annotated images or videos.

The internal database may for example include a graph-based structure, such as a k-d tree or a random forest, which supports the generation and the treatment of the stored intermediate results. Said treatment includes but is not limited to:
  clustering visual features;
  computing a visual signature associated with a video subsequence;
  computing distances between visual signatures.

Classification-Based and Regression-Based Schemes

According to one embodiment, in the case of discrete outputs, the first algorithm of the invention is able to use a classifier to estimate the label corresponding to an image. The classifier might be a simple rule-based one or may rely on machine learning to be trained from an external training database where a set of images is associated with ground truth data such as labels or annotations.

According to another embodiment, in the case of continuous outputs, the first algorithm of the invention is able to use a regression algorithm to estimate the label or continuous output corresponding to an image. The regression algorithm might be a simple least-squares regression one or may rely on machine learning to be trained from an external training database where a set of images is associated with continuous ground truth data.

Machine learning tools potentially used by the first algorithm for classification or regression purposes may be for example based on Support Vector Machines, Adaptive Boosting, Content-Based Image Retrieval followed by k-Nearest Neighbor voting, Artificial Neural Networks, Random Forests, and the like.

Visual Similarity Assessment and Clustering

According to one embodiment, the invention is able to operate in a fully unsupervised manner by only relying on the image content of the video of interest.

The first algorithm may be a fully unsupervised clustering algorithm that takes as input all the images stored in the buffer and provides as output a cluster associated with each image. According to one embodiment, the cluster associated with an image can be mapped to a color that can be superimposed on the timeline at the position corresponding to the image in the video buffer.

The unsupervised clustering algorithm may be based on K-Means clustering, hierarchical clustering, Mean Shift clustering, Graph Cuts, Random Forest-based clustering, Random Ferns, or any other standard clustering algorithm. The clustering algorithm may use intermediate results stored in the internal database.

According to one embodiment, a visual signature is built for each image stored in the buffer using any adequate technique such as the bag-of-visual-words, Haralick features or invariant scattering convolution networks and relying on the internal database as a training database. Then, the unsupervised clustering of the images may be performed based on their visual signatures.

Coupling Interpretability Characterization and a Second Algorithm

If the first algorithm has provided at least one discrete output for each image, a second algorithm may be applied to video subsequences made of consecutive images of equal output, and provide at least one output to be displayed. As mentioned earlier, such discrete output may be referred to as a temporal segmentation of the video of interest. The second algorithm may use at least one output of the first algorithm, intermediate results stored in the internal database, data stored in the external database and the like.

According to one embodiment, the first algorithm provides a means of detecting, in the video of interest, video subsequences that are optimal queries for the second algorithm.

The second algorithm includes but is not limited to:
image or video mosaicing to create an image of larger field of view from at least one video subsequence;
unsupervised clustering of video subsequences, for example to cluster the video of interest into visual scenes;
unsupervised characterization of the video subsequences, for example to estimate the visual atypicity of each video subsequence;
supervised classification of the video subsequences, for example to associate a predicted diagnostic or pathological class and a prediction confidence level with a video subsequence or with the complete video of interest
supervised regression of the video subsequences, for example to estimate a probability of the entire video of interest of of each video subsequence of belonging to a given pathological class;
supervised characterization of the video subsequences, for example to estimate the visual ambiguity of each video subsequence or of the entire video of interest with respect to a set of diagnostic or pathological classes;
content-based video or image retrieval, with at least one video subsequence as query, for example to extract from an external database already annotated videos that are visually similar to the query.

According to one embodiment, when the second algorithm is a content-based retrieval algorithm, the invention allows users, typically physicians, to efficiently create, from the results of the first algorithm, reproducible queries for the second algorithm in a semi-automated fashion. This may, in some scenarios, allow boosting retrieval performance when compared to using uncut videos as queries or when compared to fully automated query construction. Such a semi-automated approach may also allow us to approach the performance of carefully constructed queries by a human expert.

To achieve this, our query construction approach may be decomposed in two steps. In a first step, an automated temporal segmentation of the original video into a set of subsequences of interest may be performed thanks to any of the previously described methods such as kinematic stability or image quality assessment. A second step consists in a fast user selection of a subset of the segmented sub-sequences. The physician may simply be asked to keep or discard the subsequences provided by the first step. Although each of the possible sub-sequences may possibly contain images of different tissue type, the segmentation step will typically make each subsequence much more self-consistent than the original uncut video. The simplified user interaction thus allows a fast and reproducible query construction and allows the physician to construct a query with sufficient visual similarity within and between the selected subsequences.

In one variant, the user is asked to briefly review each segmented subsequence and click on the ones that are of interest to him. Because all this may happen during the procedure, the temporal segmentation may advantageously be compatible with real-time.

Given the user-chosen subset of subsequences, the invention may use this subset to create a visual signature for the content-based retrieval algorithm to query the external database. The most visually similar case may then be presented to the physician along with any potential annotations that may be attached to them.

In one variant, the bag of visual words method, Haralick features or any other compatible method may be used to compute one signature per image for each image in a selected video subsequence. By averaging these signatures, each subsequence and each video can be associated with a visual signature that may be used for retrieval purposes.

In another variant, rather than computing one signature per video, each subsequence may be associated to one visual signature that may then be used for retrieval purposes. The retrieved cases for all subsequences may then be pooled and reused according to their visual similarity with their corresponding initial subsequence query.

As should be clear from the previous description, for computational reasons, when both the first algorithm and the second algorithm rely on the same intermediate computations, such computation may be performed only once and shared across the two algorithms. This is for example the case when relying on a common set of feature descriptors, such as a regular dense grid of SIFT, SURF and the like, for both temporal segmentation based on kinematic stability and for content-based retrieval based on bag of words.

While the foregoing written description of the invention enables one of ordinary skill to make and use what is considered presently to be the best modes thereof, those of ordinary skill will understand and appreciate the existence of variations, combinations, and equivalents of the specific embodiments, methods, and examples herein. The invention should therefore not be limited by the above described embodiments, methods, and examples, but by all embodiments and methods within the scope and spirit of the invention as disclosed.

The invention claimed is:

1. A method to support clinical decision by characterizing images acquired in sequence through a medical device, comprising:
    storing images in a buffer;
    for each image in the buffer, automatically determining, using a first algorithm, at least one output based on at least one image quantitative criterion,
    wherein the at least one image quantitative criterion is one selected from the group consisting of kinematic stability, similarity between images, probability of belonging to a category, image or video typicity, image or video atipicity, image quality, and presence of artifacts, and
    wherein the at least one output of the first algorithm comprises a cluster associated with each image; and
    extracting, from the buffer, the images according to said at least one output for each image.

2. The method according to claim 1, wherein the at least one output of the first algorithm is a boolean, scalar or vector value.

3. The method according to claim 1, wherein a timeline is formed of temporal regions corresponding to images with equal outputs.

4. The method according to claim 3, wherein said timeline is formed of temporal regions corresponding to consecutive images with said equal outputs.

5. The method according to claim 1, further comprising:
    selecting images with equal said at least one output of the first algorithm; and
    processing the selected images using a second algorithm, the second algorithm being configured to provide at least one second output.

6. The method according to claim 5, further comprising: displaying said at least one second output.

7. The method according to claim 5, wherein the second algorithm is a content-based image or video retrieval algorithm.

8. The method according to claim 5, wherein the second algorithm is based on image or video classification.

9. The method according to claim 5, wherein the second algorithm is an image or video mosaicing algorithm.

10. The method according to claim 5, wherein the second algorithm uses an external database.

11. The method according to claim 5, wherein the second algorithm is based on machine learning.

12. The method according to claim 1, wherein the first algorithm uses an external database.

13. The method according to claim 1, wherein the first algorithm is based on machine learning.

14. A system to support clinical decision by characterizing images acquired in sequence through a medical device, the system comprising means for implementing the steps of a method according to claim 1.

* * * * *